UNITED STATES PATENT OFFICE.

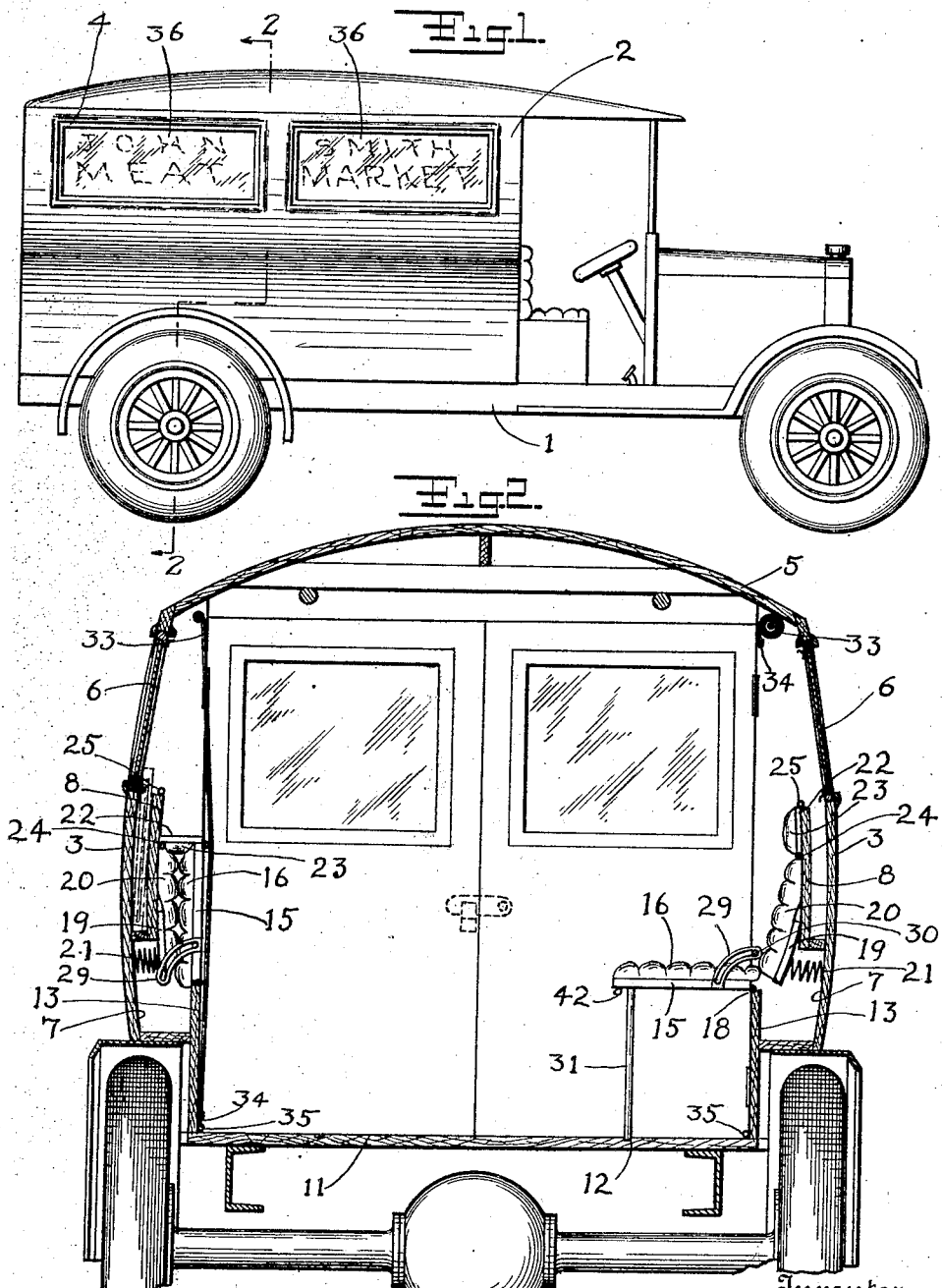

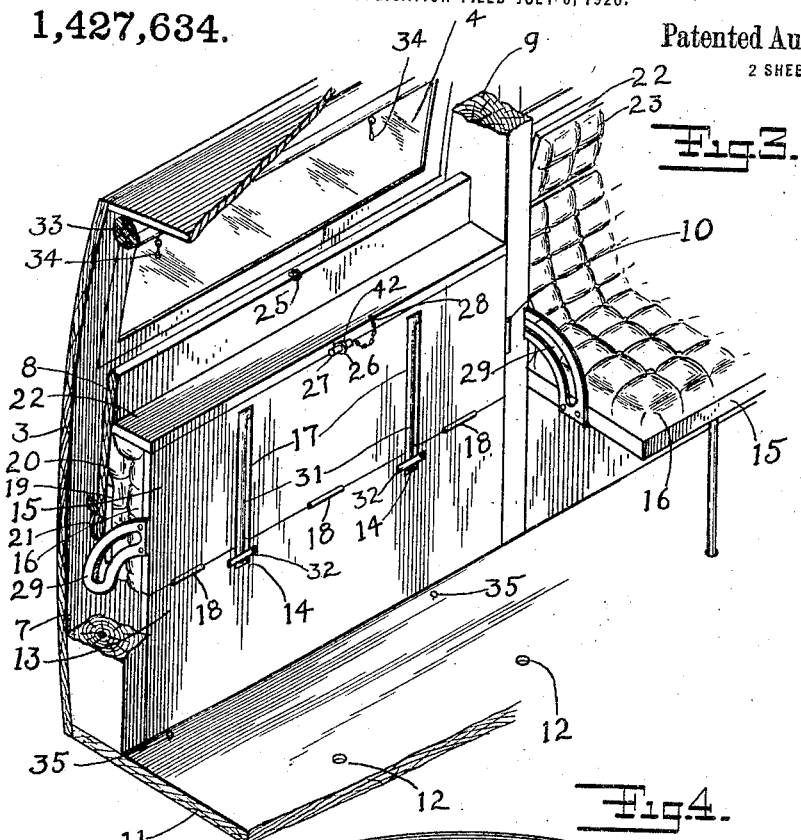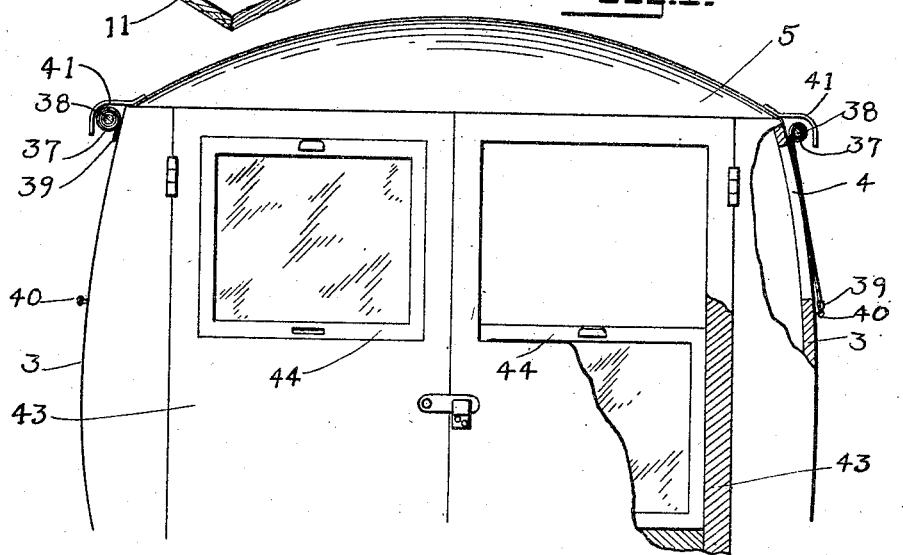

WILLIAM REINHARDT, OF NEW YORK, N. Y.

CONVERTIBLE VEHICLE BODY.

1,427,634.  Specification of Letters Patent.  Patented Aug. 29, 1922.

Application filed July 6, 1920. Serial No. 394,303.

*To all whom it may concern:*

Be it known that I, WILLIAM REINHARDT, a citizen of the United States, and resident of New York, in the county of Kings and State of New York, have invented certain new and useful Improvement in Convertible Vehicle Bodies, of which the following is a specification.

This invention relates to improvements in a convertible vehicle body.

The object of this invention is to provide a convertible body which may be effectively utilized, in conjunction with a vehicle, for either business or pleasure purposes.

Other objects of this invention are to provide in such a body seats or couches which may be easily and manually collapsed thereby converting it for business uses, means for concealing said seats when in inoperative position and means for otherwise preparing said body for either pleasurable or business uses.

The above and further objects in view will be more clearly understood from the following description together with the accompanying drawings forming a part of this specification and in which:

Figure 1 is a side view of a preferred form of my convertible vehicle body.

Figure 2 is a transversal cross-sectional view of same taken on line 2—2 of Figure 1, showing in detail one seat or couch in open position and another in folded or collapsible position.

Figure 3 is a perspective view of part of the inside of same disclosing a seat or couch in collapsible position.

Figure 4 is an end view of same partly in cross section disclosing the outside curtain and entrance doors.

In Figures 1 and 2 of the drawings there is shown a chassis 1 upon which is mounted the convertible vehicle body 2 having outer walls 3, provided with window openings 4, and a roof 5. Slidable windows 6 are provided in window openings 4 which are disposed so as to slide downwardly within pockets formed between the inner surfaces 7 of outer walls 3 and upright boards 8.

The upright posts or supports 9 having segmental shaped grooves 10 are provided at the ends and intermediate between the ends forming a frame structure for body 1. The floor 11 has a series of sockets or indentations 12 the use of which is described below. Disposed between posts 9 and secured thereto and to floor 11 are inner walls 13 which are provided with grooves 14.

Within body 1 are disposed a series of collapsible seats or couches each of which comprises a seat member 15 suitably upholstered as shown at 16 and provided with grooves 17 adapted to register with grooves 14; said seat member being swingably secured at its further end to inner wall 13 by means of hinges 18 or any other suitable manner, and forming a continuation thereof when folded.

The back rest member 19 having a suitable upholstered covering 20 is secured at its upper end to inner surface 7 of outer wall 3 or to upright boards 8, and at its lower end to one end of an expansion spring 21. The other end of spring 21 is attached to inner surface 7 of outer wall 3. The head rest member 22 has a suitable upholstered covering 23 and is hingedly secured to back rest member 19 as shown at 24. The screws 25 and 26 are secured at the top of upright 8 and head rest member 22, their relative position being such that when the head rest member is swung back they are adjacent to each other and may be engaged by lock bar 27 flexibly secured to head rest member 22 by chain 28 or in any other suitable manner. The segmental sections or brackets 29 are secured at the ends of seat member 15 and guidedly engage grooves 10 in posts 9, its motion being arrested by stops 30, thereby assisting seat member 15 being suspended. Legs 31 are swingably attached at the bottom of seat member 15 and are adapted to engage sockets 12 in floor 11 when seat 20 is in operative position. By means of brackets 29 and legs 31 seat 15 is held firmly in position. When seat 15 is collapsed legs 31 are swung back into the grooves 14 and 17 and kept there by hooks 32.

Spring operated shades or curtains 33 are mounted at the upper end and inner surface 7 of outer walls 3 and are adapted to be raised or lowered when desired. Attached to curtains 33 are snap hooks 34 which, when said curtain is lowered, engage eye screws 35 attached to floor 11. The collapsible seats are thereby concealed when in inoperative position. Suitable lettering may be affixed on curtain 33, as indicated at 36 in Figure 1, which is displayed when curtain is lowered and vehicle converted for business purposes.

Spring operated adjustable shades 37 are mounted on the outer surface of outer walls 3 and above window openings 4 as shown at 38, Figure 4. These shades may be conveniently raised or lowered. Hook screws 39 are secured to shades 37 and eye screws 40 to the outer walls 3, so that said shades may be held fast when lowered. Shade shields 41 secured to top 5 are adapted to protect shades 37, when inoperative, from injury.

Figures 2 and 3 show the collapsible seats in operative and inoperative positions. To make said collapsible seat ready for an occupant, legs 31 are released from hooks 32, and seat member 15 pushed downwardly, legs 31 being adjusted to engage sockets 12. The head rest member 22 is then raised and locked by means of lock bar 27. The expansion spring 21 automatically throws the lower portion of back member 19 outwardly and through its resilient effect adds to the comfort of the occupant.

When it is desired to convert the vehicle for business purposes, seat members 15 are raised upwardly and backwardly, legs 31 are locked in the provided grooves and head rest members 22 loosened, swung downwardly and secured in that position to seat members 15 by inserting lock bars 27 in eye screws 26 and 42. The seat members are thereby held firmly when in inoperative position thus forming a continuation of inner walls 13. Curtains 33 are then lowered and fastened to the floor. Any suitable writing may be displayed on the curtains through the window openings.

The body 2 is provided with suitable swinging doors 43 having slidable windows 44 operated similar to those described above.

Having thus described my invention and reserving for myself the right to make necessary alterations and amendments consistent with the broad scope of my idea, I claim:

1. In a convertible vehicle body adapted for use as a delivery or pleasure carrier and provided with outer and inner side-walls disposed so as to form a space thereinbetween and uprights forming a frame structure for said body; a plurality of collapsible seats disposed between said uprights, each of which comprises an upholstered seat member hingedly secured to said inner wall, an upholstered back rest member secured at its upper end to said outer wall, an expansion spring attached at one end to said outer wall and at its other end to the lower portion of said back rest member an upholstered head rest member hingedly attached to the upper portion of said back rest member, means attached to the inner surface of said outer walls and said head rest member, for facilitating said head rest member being locked in operative position, means provided at said uprights and said seat member for facilitating the suspension of the latter, and legs swingably attached to said seat member, substantially as described.

2. In a convertible vehicle body to be utilized as a pleasure or delivery carrier and provided with outer and inner side walls disposed so as to form a hollow space between them, a series of uprights forming a frame for the body and a floor provided with a series of sockets; a plurality of collapsible seats disposed individually between said uprights, each consisting of a seat member hingedly secured at its inner end to said inner wall, adapted to be opened, a back rest member secured at its upper end to said outer walls, an expansion spring connected at one end to said outer wall and at its other to the loose end of said back rest member, adapted to press said back rest member outwardly, a head rest member hingedly secured at its lower end to said back rest member, locking means adapted to facilitate said head rest member being fixedly secured in open and closed positions, a pair of swingable supports secured to said seat member, its lower ends being adapted to register with the sockets in said floor when said seat is in operative position, and means provided at said uprights and said seat member for facilitating the suspension of the latter, substantially as described.

3. In a convertible vehicle body adapted for use as delivery or pleasure carrier and provided with outer and inner side walls forming a hollow space thereinbetween, and upright posts at the ends and intermediate between the ends forming a frame structure for said body; collapsible upholstered seats hingedly attached at the inner walls and forming when collapsed an extension of the inner wall, said seats being placed between said posts and adapted to suspend when opened, collapsible legs hinged at the bottom of said seats, back rests attached to said outer side walls, head rests hingedly secured to said back rests, and locking means adapted to keep said head rests in operative position and support said seats when the latter is in inoperative position.

4. In a convertible vehicle body of the character described, having in combination, outer and inner walls, upright supports forming a frame for the body and a floor having a series of recesses; collapsible seats disposed between said upright supports each comprising an upholstered seat member hingedly secured to said inner wall adapted to swing outwardly and downwardly when brought into operative position, said seat being suspended when in operative position, an upholstered back rest secured to said outer walls, means for causing said back rest to contact with said seat member, an upholstered head rest hingedly secured above said back rest, means for fixedly securing said head rest to said outer wall when in operative position and to said seat member when in inoperative position, and a pair of supports swingably attached to said seat member adapted to be engaged with the recesses in said floor.

5. In a convertible vehicle body having in combination outer and inner walls disposed so as to form a hollow space thereinbetween, and upright supports forming a frame for the body; collapsible seats disposed between said uprights each of which comprises an upholstered seat member swingably attached to said inner walls and forming a continuation thereof when in inoperative position, an upholstered back rest member secured to said outer wall, means for outwardly extending said back rest member when said collapsible seat is unfolded, an upholstered head rest member swingably secured to said back rest member, means for locking said head rest member in operative position, means for keeping said seat in collapsed position when desired, and means for suspending and supporting said seat member, when in operative position.

6. In a convertible vehicle body of the character described provided with outer side walls, upright supports and inner side walls disposed between said supports; foldable seats each consisting of a seat member swingably attached to said inner wall, a back rest secured to said outer walls, a head rest secured to said back rest in such manner as to fold inwardly and join said back rest and said seat when in collapsed position, and means for supporting said seat member, said folding seats being disposed above said inner walls so as to form a continuation thereof when in collapsed position.

7. In a collapsible seat to be used in conjunction with a convertible vehicle, the latter being provided with outer side walls, upright supports and inner side walls disposed between said walls; the combination of a seat member hingedly secured to one of said inner side walls, a back rest member disposed directly over said seat member and extendedly secured to one of said outer walls, a head rest member hingedly secured to said back rest member, said seat member being adapted to fold upwardly and face said back rest member, and said head rest member being adapted to fold downwardly and co-operate with said seat member when the latter is folded, means for keeping said seat and head rest members in their folded positions, and removable means disposed above the seat adapted to conceal said seat when in collapsed position.

8. In combination with a convertible vehicle body, a collapsible seat comprising a seat member, a back rest member and a head rest member, said members cooperating with each other so as to form when collapsed a box-like formation, one of its sides being a continuation of the inner wall of the vehicle, and means for concealing said seat when in collapsed position.

Signed at New York, in the county of New York, and State of New York, this 1st day of July, A. D. 1920.

WILLIAM REINHARDT.